Oct. 21, 1958 R. FERWERDA 2,857,065
BOOM SUPPORTED OFFSET DIGGING APPARATUS
Original Filed Aug. 15, 1952 5 Sheets-Sheet 1

INVENTOR.
RAY FERWERDA
BY
Hyde, Meyer, Baldwin & Doran
ATTORNEYS

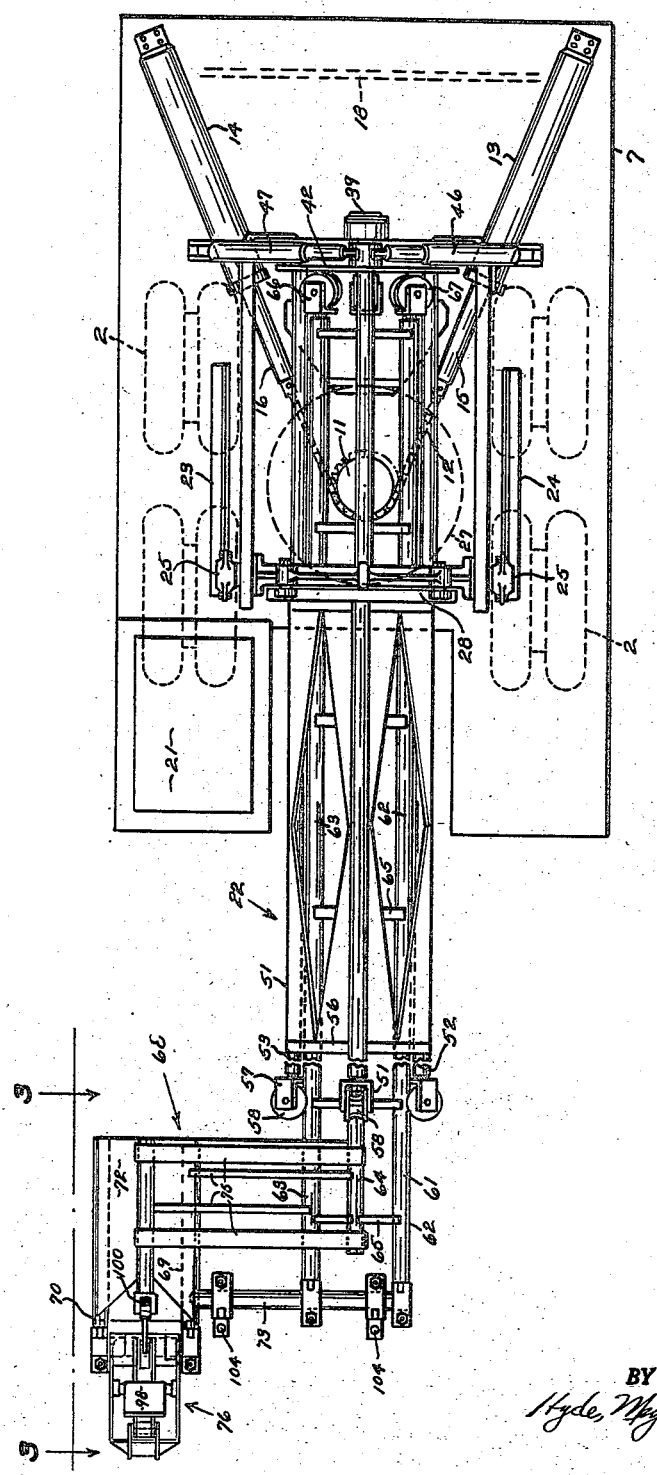

Oct. 21, 1958 R. FERWERDA 2,857,065
BOOM SUPPORTED OFFSET DIGGING APPARATUS
Original Filed Aug. 15, 1952 5 Sheets-Sheet 3
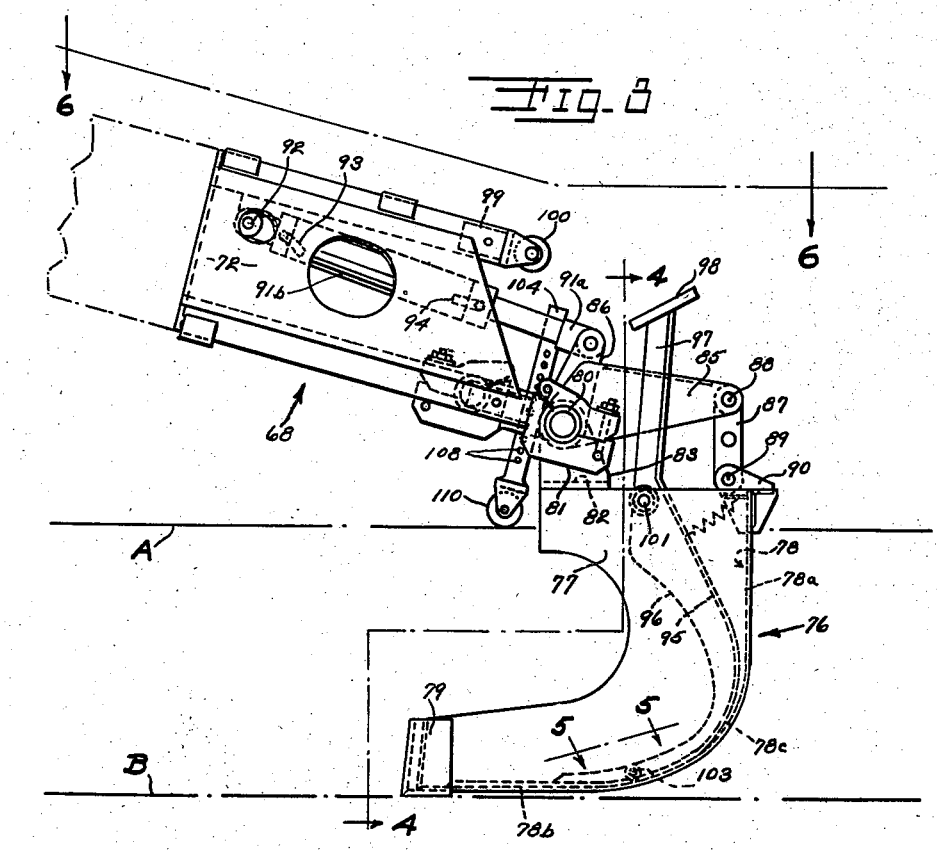
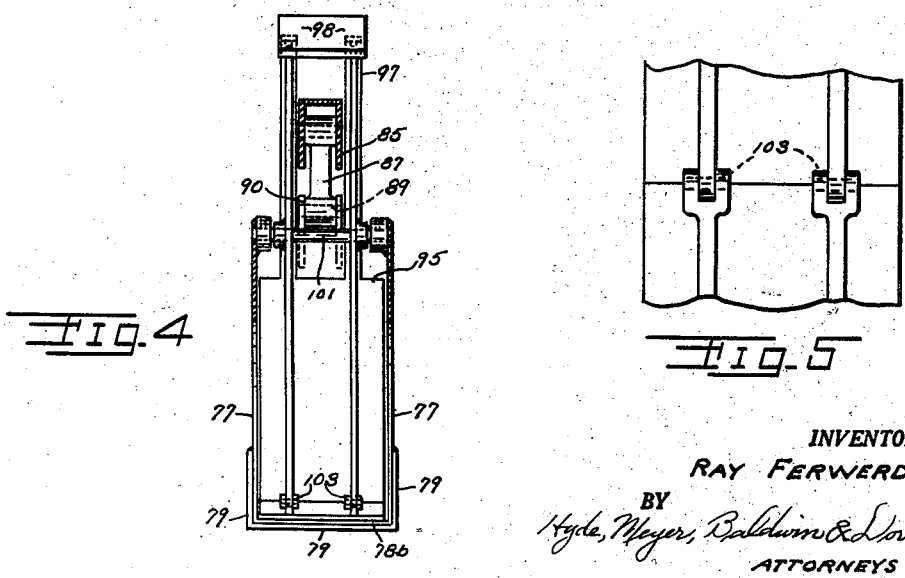
INVENTOR.
RAY FERWERDA
BY
Hyde, Meyer, Baldwin & Doran
ATTORNEYS Oct. 21, 1958  R. FERWERDA  2,857,065
BOOM SUPPORTED OFFSET DIGGING APPARATUS
Original Filed Aug. 15, 1952  5 Sheets-Sheet 4
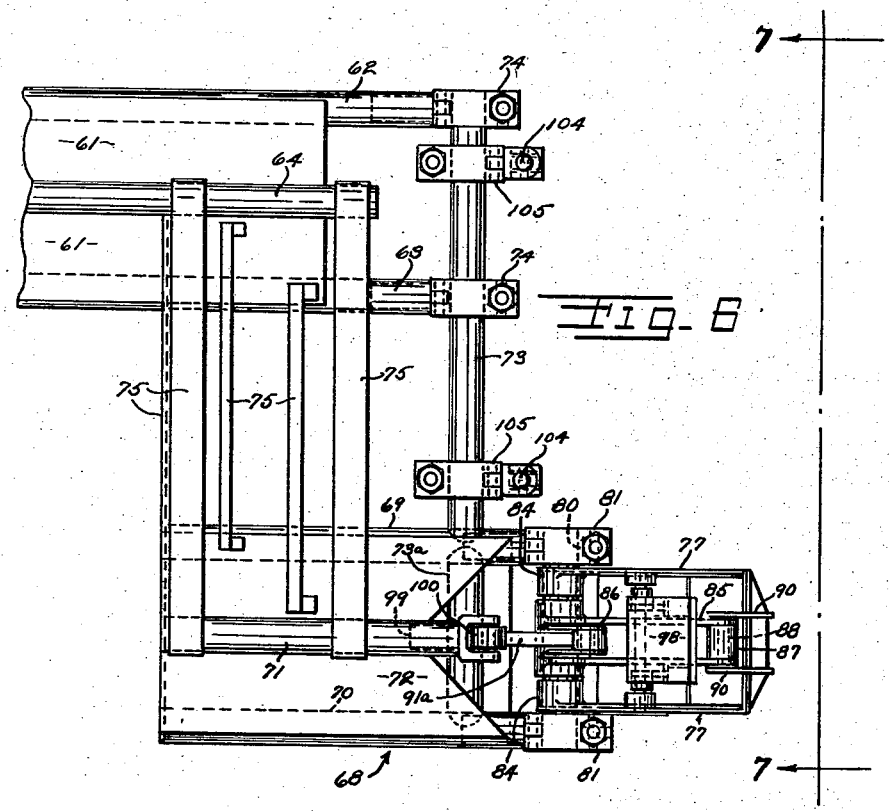
INVENTOR.
RAY FERWERDA
BY
Hyde, Meyer, Baldwin & Doran
ATTORNEYS

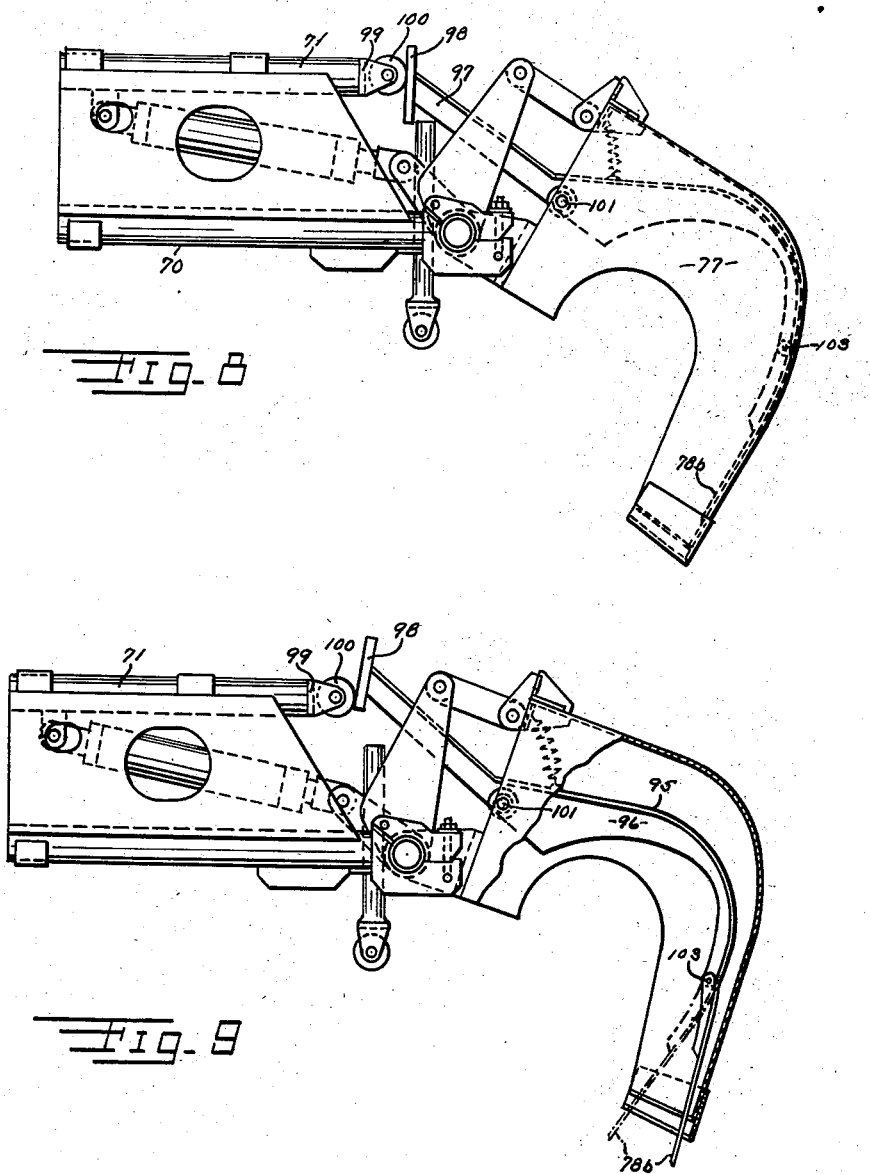

United States Patent Office 2,857,065
Patented Oct. 21, 1958

2,857,065

BOOM SUPPORTED OFFSET DIGGING APPARATUS

Ray Ferwerda, North Miami, Fla.

Original application August 15, 1952, Serial No. 304,544. Divided and this application October 18, 1955, Serial No. 541,211

4 Claims. (Cl. 214—132)

This invention relates to improvements in a boom supported offset digging apparatus.

One of the objects of the present invention is to provide a digging implement operated by a telescopic boom mounted on a vehicle, wherein the digging implement is either substantially in line with one side of the vehicle, or laterally outside the rest of the vehicle, making it possible to excavate close against obstacles such as building, poles, wires and the like. The invention also makes it possible to keep the vehicle on a roadway while digging laterally to one side of the roadway.

Another object of the present invention is to provide a novel scoop bucket, mounted offset from the main boom, and open in a fore-and-aft direction so that digging is easily accomplished using the telescoping action of the boom.

Still another object of the invention is to provide novel stop means engaged between the boom and the ground below it so as to automatically position the bucket for digging a predetermined distance below said ground level.

The invention also provides the novel combination of a boom supporting a digging bucket and means for oscillating the boom about its own longitudinal axis, so that the material scraped up by the bucket may be dumped to one side of its excavation without swinging the boom.

Other objects and advantages of the invention will be apparent from the accompanying drawings and specification, and the essential features thereof will be set forth in the appended claims.

In the drawings,

Fig. 2 is a top plan view of the same;

Fig. 3 is a side elevational view, enlarged, taken from the position of the line 3—3 of Fig. 2;

Fig. 4 is a view, partly in section, taken along the line 4—4 of Fig. 3;

Fig. 5 is a fragmental view, enlarged, taken from the position of the line 5—5 of Fig. 3;

Fig. 6 is a top plan view of the structure of Fig. 3, being taken from the position of the line 6—6;

Fig. 7 is an end elevational view of the structure of Fig. 6, being taken from the position of the line 7—7, and showing my invention used for digging a ditch a predetermined distance below the grade of a roadway; while Figs. 8 and 9 are views similar to Fig. 3 showing different positions of the parts.

Figure 1:
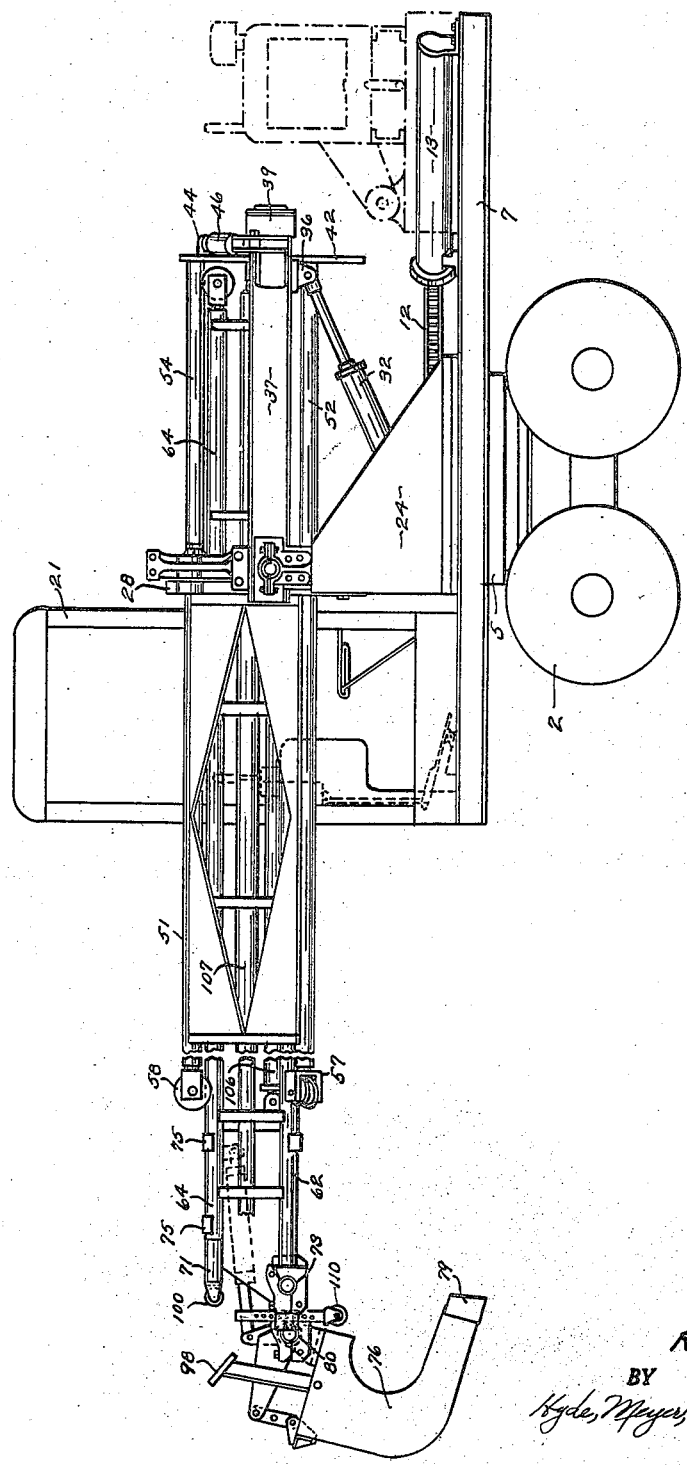
Fig. 1 is a side elevational view of a vehicle and boom with which my invention may be used.

For illustrating a vehicle and boom with which the present invention may be used, I have shown the material moving apparatus which is fully described and claimed in United States Patent No. 2,541,045, granted February 13, 1951, to myself and Koop Ferwerda. A brief description of this apparatus will be given and for further details reference may be had to the above named patent.

As clearly shown in Figs. 1 and 2 of the drawings, the material moving apparatus comprises a support 1, preferably in the form of a vehicle of rigid construction with heavy wheels 2 and axles 3 and a substantial frame or body member 4, on the upper side of which a circular turntable unit 5 provided with roller bearings 6 is mounted. The upper turntable member is secured to the under side of an enlarged platform 7, which is provided at a central point with an opening through which a fixed vertical standard 8 secured at its lower end 9 to the vehicle body member 4, is engaged. The standard 8 carries at its upper end a stationary sprocket 11, over which a sprocket chain 12 is engaged. The sprocket chain 12 is preferably of a length adequate to carry the platform 7 through a rotation around the turntable of at least a complete circle.

The means for rotating the platform in the full hydraulic system illustrated provides a hydraulic cylinder unit at each end of the sprocket chain 12. These cylinder units 13, 14, are preferably anchored on the platform floor along diagonal lines at each of the rearward corners. Each cylinder should be of sufficient length to permit its piston rods 15, 16, respectively, a long range of motion. Oil under pressure is supplied selectively to one or the other of these cylinders according to the direction of motion desired. An oil line connection 18 between the two cylinders, transfers oil from one cylinder to its companion cylinder to correspond with the direction of movement.

The rotatable platform 7, at its forward portion at one side is provided with an operator's cab 21, and the valve controls are centered at such point.

Centrally of the platform 7, an extensible boom 22 is provided, the forward portion of the main body of the boom projecting beyond the front edge of the platform, in the apparatus illustrated, approximately half its length. In order to obtain longer range of action and balanced operation the boom is pivoted on the platform at an intermediate point, in the apparatus illustrated, at a point approximately one-third the distance from its rearward end. The horizontal pivot for the boom is somewhat in advance of the turntable center and is part of a broad rigid structure supporting the boom horizontally in a plane some distance above the floor of the platform 7.

The supporting structure for the boom 22 comprises a pair of heavy plates 23, 24, securely mounted centrally of the platform 7 and spaced apart a distance somewhat greater than the turntable width. At the forward upper edges of the plates, trunnion bearings 25, are mounted, within which the stub axles 26 are engaged, the stub axles being secured to the opposite sides of an annular roller bearing track 27 within which an annular roller bearing shell 28 is rotatably engaged. The plates 23, 24, are cut away on an angle at their rearward portion 29 to a point adjacent the floor of the platform and immediately inside the walls thus provided, boom raising and lowering cylinders 31, 32, are pivotally mounted on pivot bearing 33 mounted on the platform immediately below the trunnion bearings 25 of the boom. The piston rods 35 of the boom raising and lowering cylinders are pivotally engaged with pivot pins 35' mounted in brackets 36 at the lower rearward ends of a rearwardly extending frame 37 securely mounted on the rearward face of the annular roller bearing track 27 heretofore described.

The rearward portion of the frame 37 is formed of a built-up cross-member 38 having a large central bearing 39 for the main rotatable boom body 51 which terminates in a large circular end plate 42, carrying centrally a stub shaft (not shown) engaged in the bearing 39. The end plate 42 also has securely mounted thereon a bracket 44 providing two pivot pins adjacent its upper margin above the central bearing 39.

The cross-member 38 has upturned end members providing spaced brackets 45 within which are mounted the axially rotating, tilting, cylinders 46, 47. The pistons 48, 49, of said cylinders are connected to the respective pivot pins of the bracket 44, and oil pressure selectively directed into one of these cylinders produces axial rotation of the entire boom structure.

The extensible axially rotatable boom structure comprises the rearward section 51, preferably formed of a skeletonized frame of three tubular members 52, 53, 54, of extended length secured in the rearward end plate 42, preferably arranged in triangular relation to provide two lower parallel trackways 52, 53, and a central upper trackway 54.

The rearward boom section 51 is securely engaged within the annular roller bearing shell 28 which, as stated, rotates within the annular roller bearing trackway heretofore described. Adjacent its forward end the boom section 51 is provided with a triangular bracing member 55, and it may also have one or more similar intermediate bracing members, such as shown at 56.

At the extreme forward ends of the tubular members 52, 53, 54, brackets 57 carrying grooved rollers 58 are provided for cooperation with the extensible or telescopic inner boom section 61. The boom section 51 is preferably made very rigid and its central portion may be provided with reinforcing webs or gusset plates of sheet metal 59 welded to the tubular members 52, 53, 54 on their outer surfaces or to the brace bars secured thereto.

The inner boom section 61 is very similar in construction to the outer boom section 51 having three triangularly related tubular members 62, 63, 64, with bracing members 65 at intervals of their length. At their rearward ends the tubular members 62, 63 and 64 each carry a bracket 66 carrying a grooved roller 67 similar to the rollers 58 on the boom section 51. It will be noted that the tubular members of the inner boom section bear against the rollers 58 at the forward end of the boom section 51, and that the rollers 67 on the rearward end of the section 61 bear against the tubular members of the boom section 51. The structure thus has very little friction to overcome when the boom extension moves outwardly or in the reverse direction.

The boom extension and implement control cylinders are shown at 106 and 107 in Fig. 1. Main cylinder 106 has its rear end attached to the main boom portion and has its piston rod connected at its front end to the extensible boom portion so that pressure fluid supplied in rear of the piston will extend the boom and pressure fluid supplied in front of the piston will retract the boom. Positioning cylinder 107 is for controlling an implement mounted on the extensible boom portion, but is not used with the present invention. The hydraulic control system is as shown in Fig. 5 of the above mentioned patent.

The telescopic boom and arrangement of the hydraulic pressure lines may also take any of the forms shown in the copending application of myself and Koop Ferwerda, Serial No. 203,156, filed December 28, 1950.

The present invention provides a bucket-supporting boom portion 68, laterally offset from the telescopic boom and generally parallel thereto. The boom portion 68 is preferably formed of three axially extending tubular members, 69 and 70 on the bottom, and 71 on the top. These are rigidly connected by relatively light plates or bracing members 72. The boom portion 68 is rigidly connected to the extensible boom portion 61. A tubular member 73 is rigidly mounted in brackets 74, normally used for mounting an implement on the end of the telescopic boom. Members 73 is welded to tubular member 69. An extension tube 73a is welded between members 69 and 70. Braces rigidly connected between boom portions 61 and 68 are shown at 75.

The digging implement is shown as a bracket 76 of scoop form having two generally parallel side walls 77 rigidly connected by a continuous wall 78 having a back wall portion 78a and a bottom wall portion 78b connected by a curved wall portion 78c. The side walls are generally C shape in form. The digging ends of side walls 77 and bottom wall 78b are provided with hardened digging edges indicated at 79. The bracket 76 is in the form of a scoop so as to dig in a fore-and-aft direction, parallel to the movement of the telescopic boom. The scoop is shown opening rearwardly toward the operator's cab 21 so that he may see what he is doing. However, the scoop might open forwardly.

The bucket 76 is mounted for pivotal action about hollow tubular shaft 80. This shaft is fixed in brackets 81 carried at the front end of boom portion 68. A plate 82 fixed to bucket side walls 77 carries two upstanding ears 83, each of which terminates in a hollow trunnion 84 embracing shaft 80. Crank arms 85 and 86 move together about shaft 80 as a pivot. Arm 85 comprises two parallel plates between which link 87 is pivoted at point 88. The other end of link 87 is pivoted at 89 to ears 90 secured to bucket 76. Arm 86 comprises two parallel plates between which is pivotally mounted piston rod 91a of a cylinder and piston jack 91, whose cylinder 91b is pivotally mounted at 92 on boom portion 68. The jack 91 is double acting and pressure fluid is supplied or discharged through conduits 93 and 94 connected to a suitable hydraulic system such as that shown in the above mentioned copending application of Ray and Koop Ferwerda. Thus, operation of jack 91 oscillates bucket 76 about shaft 80.

While the scooped-up contents of the bucket 76 might be dumped by moving it to the position of Fig. 8, I prefer to provide means for aiding the discharge of the bucket contents which may be mud or sticky clay. Such a means is shown as ejector blade 95. This blade extends between the side walls 77 and generally conforms to the bottom and curved wall portions 78b and 78c. Above that, it inclines upwardly and away from back wall portion 78a. Preferably two parallel stiffening ribs 96 are rigid with blade 95 on the inside. These ribs extend upwardly above the bucket to provide a rigid arm 97 provided at its upper end with an inclined striker pad 98. Mounted in the hollow of boom tubular member 71 is a stop 99, carrying a friction reducing roller 100. Arm 97 is pivotally mounted on bar 101, rigidly held in bucket side walls 77. Tension spring 102, held between arm 97, below pivot 101, and bucket 76 normally holds blade 95 in the position of Figs. 3 and 8.

Preferably, but not necessarily, the lip portion of blade 95, which is mainly the bottom portion 78b, is hingedly connected to the rest of the blade at hinge 103 extending at right angles to side walls 77. This aids in expelling the contents of bucket 76.

Preferably, but it is not always necessary, I provide stop means engageable between the telescopic boom and the ground beneath it so as to limit the depth at which bucket 76 will dig, as shown at line B in Fig. 3, below a ground line A. To this end one or more, preferably two, stops 104 are mounted on shaft 73 in brackets 105. Preferably, the stops 104 are adjustable as by having a series of holes any one of which is engageable by a pin 109 holding the stop in the bracket. Preferably, also, a friction reducing roller 110 is carried by each stop 104 at its lower, ground-engaging end.

The operation of my device is as follows. The operator in cab 21 places the vehicle in the proper position and extends boom portion 61, at the same time lowering the boom until bucket 76 engages the ground. The digging angle may be controlled by jack 91. Boom portion 61 is then retracted causing bucket 76 to scoop up some material. The boom is then swung, using cylinders 13 and 14, or otherwise manipulated to a point where bucket 76 may be dumped. Sometimes this may be done by oscillating or tilting the boom, using cylinders 46 and 47, thus making it unnecessary to swing the boom. As the material in the bucket is being dumped, jack 91 is actuated to bring striker pad 98 into engagement with stop 99, 100 as shown in Fig. 8. Further oscillation of bucket 76 counterclockwise around shaft 80 will cause movement of ejector blade 95 clockwise about its pivot 101, from the loading position of Figs. 3 and 8 to the dumping position of Fig. 9. At this time lip 78b, if hinged at 103, will swing from the full line position of Fig. 9 to the dot-dash position to aid in discharging the contents of the bucket.

Referring to Fig. 7, because of the offset of boom portion 68, the vehicle may remain on a paved roadway 111 and dig a ditch 112 to one side thereof. Using the stops 104, the bottom of the ditch may be made to follow the grade of roadway 111 which is often desired for sewer and utility lines.

Referring to Fig. 2, it will be noted that bucket 76 is located to line up with the laterally outermost part of the vehicle, as shown by line C, and by boom manipulation the bucket may be used to dig laterally outside of line C.

What I claim is:

1. In combination, a vehicle, a telescopic boom mounted thereon and having a main boom portion and an extensible boom portion, means on said vehicle for extending and retracting said extensible boom portion, a rigid structure mounted on the outer end of said extensible boom portion and extending generally at right angles thereto toward one side of said vehicle, an implement-supporting boom portion rigidly mounted on said rigid structure and spaced from said extensible boom portion, said implement-supporting boom structure being generally parallel to said extensible boom portion, an earth digging instrument mounted on said supporting boom portion and extending downwardly therefrom, said main boom portion and said extensible boom portion being both generally triangular in cross-section having a base of said triangular cross-seciton generally horizontal in normal position, said rigid structure comprising a bar rigidly connected across the base of said triangular extensible boom portion and rigidly connected with said supporting boom portion, and ground-engaging means below said extensible boom portion and rigidly connected therewith for stopping said boom a predetermined distance above the ground.

2. In combination, a vehicle having wheel means adapted to travel along the ground in a path, an extensible boom mounted on said vehicle and extending in the general direction of said path, said boom having a main boom portion and an extensible boom portion extensible beyond said main boom portion, a tool-supporting boom portion laterally offset from said extensible boom portion and rigidly connected therewith, and a digging tool mounted on said tool-supporting boom portion in position to dig in the ground a trench generally parallel to said path, the laterally outermost portion of said tool being so far out as to be laterally outside of the path traveled by said wheel means when said boom is generally parallel to said path.

3. The combination of claim 2, including ground-engaging means below said extensible boom portion and rigidly connected therewith for maintaining said boom and said digging tool at fixed level relative to the ground.

4. The combination of claim 2 including means on said vehicle for oscillating said boom about a substantially horizontal axis, and for oscillating said boom about the axis of the main boom portion, and for extending and retracting said extensible boom portion.

References Cited in the file of this patent

UNITED STATES PATENTS

| | | |
|---|---|---|
| Re. 23,392 | McDade | July 17, 1951 |
| 520,916 | Dalton | June 5, 1894 |
| 1,175,617 | De Vries | Mar. 14, 1916 |
| 1,389,021 | Vest | Aug. 30, 1921 |
| 2,501,112 | Webster | Mar. 21, 1950 |
| 2,541,045 | Ferwerda et al. | Feb. 13, 1951 |